United States Patent
Kerschberg et al.

(10) Patent No.: US 8,386,485 B2
(45) Date of Patent: Feb. 26, 2013

(54) CASE-BASED FRAMEWORK FOR COLLABORATIVE SEMANTIC SEARCH

(75) Inventors: Larry Kerschberg, Fairfax, VA (US); Wooju Kim, Seoul (KR); Hanjo Jeong, Fairfax, VA (US); Yong Uk Song, Kangwon (KR)

(73) Assignee: George Mason Intellectual Properties, Inc., Fairfax, VA (US)

( * ) Notice: Subject to any disclaimer, the term of this patent is extended or adjusted under 35 U.S.C. 154(b) by 657 days.

(21) Appl. No.: 12/533,226

(22) Filed: Jul. 31, 2009

(65) Prior Publication Data

US 2011/0029514 A1   Feb. 3, 2011

Related U.S. Application Data

(60) Provisional application No. 61/085,254, filed on Jul. 31, 2008.

(51) Int. Cl.
*G06F 7/00* (2006.01)
*G06F 17/30* (2006.01)

(52) U.S. Cl. ........ 707/736; 707/741; 707/765; 707/767; 707/768

(58) Field of Classification Search .................. 707/706, 707/707, 711, 713, 721, 722, 723, 732, 736, 707/748, 705, 718, 741, 751, 765–768, 769
See application file for complete search history.

(56) References Cited

U.S. PATENT DOCUMENTS

| | | | |
|---|---|---|---|
| 6,876,998 B2 * | 4/2005 | Evans | 1/1 |
| 7,761,480 B2 * | 7/2010 | Toledano et al. | 707/804 |
| 7,818,313 B1 * | 10/2010 | Tsimelzon et al. | 707/718 |
| 8,131,540 B2 * | 3/2012 | Marchisio et al. | 704/9 |
| 2004/0034632 A1 * | 2/2004 | Carmel et al. | 707/5 |
| 2005/0033711 A1 * | 2/2005 | Horvitz et al. | 706/50 |
| 2007/0282811 A1 * | 12/2007 | Musgrove | 707/3 |
| 2008/0104032 A1 * | 5/2008 | Sarkar | 707/3 |
| 2008/0195601 A1 * | 8/2008 | Ntoulas et al. | 707/5 |
| 2010/0318929 A1 * | 12/2010 | Hilton et al. | 715/769 |

* cited by examiner

*Primary Examiner* — Merilyn Nguyen
(74) *Attorney, Agent, or Firm* — David Grossman; David Yee; Edgar Rodriguez

(57) ABSTRACT

A service-oriented system architecture includes a computer-implemented search method and computer-implemented agent system for enabling efficient information searches on, for example, on XML databases, relational databases, and files located on intranets, the Internet, or other computer network systems. Referred to as the Knowledge Sifter architecture, the architecture may comprise, in one embodiment, a community of cooperating agents. The system architecture may be employed using a variety of methodologies, such as a case-based framework, collaborative filtering, or hybrid filtering. The case-based framework may be configured to recommend query specifications and refinements based on previously-stored user-query cases. Collaborative filtering involves the architecture recommending a set of unseen items that are preferred by other users to the active user. Hybrid filtering combines collaborative filtering and content-based filtering.

15 Claims, 15 Drawing Sheets

Case Retrieval

Input: the active user query $uq_a$ } 705
Output: a number (maxnc) of cases similar to the user query } 730
maxnc ← 10
A set of retrieved cases $RCS$ ← the Empty Set } 715
A set of expanded queries $EQS$ ← the Empty Set } 710
$CQS$ ← the powerset of $uq_a$ except the empty set
Sort elements of $CQS$ in descending order of their weights
FOREACH $cq$ in $CQS$
IF #$RCS$ < maxnc THEN
FOREACH $concept$ in $cq$
    $EC$ ← a set containing the $concept$ and its equivalent concepts
END
    $CPECS$ ← Cartesian product of $EC$ sets
    FOREACH $cpec$ in $CPECS$
    FOREACH $concept$ in $cpec$
        $HC$ ← a set containing the $concept$ and its generalized concepts
    END
    $CPHCS$ ← Cartesian product of $HC$ sets
    FOREACH $cphc$ in $CPHCS$
        $WeightOfeq$ ← a weighted sum of concept weights in $cphc$ } 720
        Add cphc to $EQS$
    END
    END
Sort elements of $EQS$ in descending order of $WeightOfeq$ } 721
FOREACH $eq$ in $EQS$
If $WeightOfeq$ > $WeightOfNextcq$ THEN
    Remove $eq$ from $EQS$ } 711
    $CASES$ ← a set of cases indexed by every $concept$ in $eq$
    IF #$RCS$ < maxnc THEN
    FOREACH $case$ in $CASES$
        $sim(C_a, C_i)$ ← a cosine similarity of $eq$ and $case$'s user query } 725
    END
    Sort elements of $CASES$ in descending order of $sim(C_a, C_i)$ } 726
    FOREACH $case$ in $CASES$
        IF #$RCS$ < maxnc THEN
        Add $case$ to $RCS$
    END
END
END

FIG. 7A

| | $rq_1$ | $rq_2$ | $rq_3$ | $rq_4$ | $rq_a$ |
|---|---|---|---|---|---|
| $dt_{s1}$ | 1 | 1 | 1 | 0 | 1 |
| $dt_{s2}$ | 0 | 0 | 1 | 1 | 0 |
| $dt_{s3}$ | 1 | 1 | 0 | 0 | 1 |
| $dt_{s4}$ | 1 | 1 | 1 | 1 | 1 |
| $dt_{s5}$ | 0 | 1 | 1 | 0 | 0 |
| $dt_{u1}$ | 1 | 1 | 1 | 0 | 0.87 |
| $dt_{u2}$ | 1 | 0 | 0 | 1 | 0.78 |
| $dt_{u3}$ | 0 | 0 | 0 | 0 | 0.33 |
| $dt_{u4}$ | 0 | 0 | 1 | 1 | 0.24 |
| $dt_{u5}$ | 1 | N/A | N/A | 0 | 0.94 |
| $sim(rq_a, rq_i)$ | 5.00 | 3.06 | -2.04 | -0.83 | |
| $sim(C_a, C_i)$ | 1 | 1 | 0.6 | 0.7 | |

FIG. 8A

Knowledge Sifter
Agent-Based Ontology-Driven Search Tool

- Home
- About
- User Guide
- New User

Welcome, demo [Logout] [Preferences]

[rushmore] [Sentence Search] [Advanced]  ⎬ 905

WordNet Senses for "Rushmore"
◉ Rushmore, Mount Rushmore. Mt. Rushmore (a mountain in the Black Hills of South Dakota; the likenesses of Washington and Jefferson and Lincoln and Roosevelt are carved on it)"  ⎬ 910

☑ Rushmore  ☑ Mount Rushmore  ☑ Mt.. Rushmore

GNIS Results:

| Location | Type | County | State | Longitude | Latitude | | Images | 10 ⌄ |
|---|---|---|---|---|---|---|---|---|
| | | | | ⌄ Google Maps | | | Google Earth | |
| Rushmore Elementary | school | Montgomery | OH | -84.1244 | 39.8656 | GMap | GEarth | Images |
| Rushmore Park | park | Montgomery | OH | -84.1247 | 39.8661 | GMap | GEarth | Images |
| Rushmore | populated place | Putnam | OH | -84.2533 | 40.8742 | GMap | GEarth | Images |
| Rushmore Post Office | post office | Putnam | OH | -84.2528 | 40.8736 | GMap | GEarth | Images |
| Rushmore Airport | airport | Pennington | SD | -103.4167 | 43.9167 | GMap | GEarth | Images |
| Rushmore Mall | locale | Pennington | SD | -103.2167 | 43.1069 | GMap | GEarth | Images |
| Rushmore, Mount | summit | Pennington | SD | -103.4583 | 43.8803 | GMap | GEarth | Images |
| Rushmore Park | park | Rock | WI | -89.0442 | 42.6614 | GMap | GEarth | Images |

[1][2][3]   ⎬ 915

GNIS Results:

| Location | Type | Country | Longitude | Latitude | | | |
|---|---|---|---|---|---|---|---|
| | | | ⌄ Google Maps | | | Google Earth | |
| Rushmore | FRM | ZA | 27.7666666666666666 | -15.8 | GMap | GEarth | Images |
| Rushmore | FRM | AS | 138.86666666666666667 | -35.26666666666666666 | GMap | GEarth | Images |

⎬ 920

FIG. 9 http://knowledgesifter.gmu.edu - datapref

[Data Preference Setup]

Semantic (Name & Description)    [10 ▼] ← 1005

Location:    [8 ▼] ← 1010

Date:  From: [January ▼] [1 ▼] [1900 ▼] (ex. 1999)    [10 ▼] ← 1015
       To:   [April ▼]   [20 ▼] [2010 ▼] (ex. 1999)

Size:  Width: [        ]   Height: [        ]

Theme: Photograph       [10 ▼]    [1 ▼] ← 1020
       Topographic Map  [8 ▼]     [1 ▼] ← 1025

Data   Terra Server     [10 ▼]
Source: Yahoo           [6 ▼]     [10 ▼] ← 1030

[        Update        ]

☐ Done                                    ○ Internet

FIG. 10

CASE-BASED FRAMEWORK FOR COLLABORATIVE SEMANTIC SEARCH

CROSS-REFERENCE TO RELATED APPLICATIONS

This application claims the benefit of U.S. Provisional Application No. 60/085,254, filed on Oct. 9, 2008, entitled "Knowledge Sifter," which is hereby incorporated by reference in its entirety.

STATEMENT REGARDING FEDERALLY SPONSORED RESEARCH OR DEVELOPMENT

This invention was made with government support under Grant Number NMA501-03-1-2022 awarded by USGS NIMA. The government has certain rights in the invention.

BRIEF DESCRIPTION OF THE SEVERAL VIEWS OF THE DRAWINGS

FIG. 7A is a diagram of a case retrieval algorithm according to an embodiment of the present invention.

FIG. 8A shows a table of a user rating prediction of unseen data items using collaborative filtering according to an embodiment of the present invention.

FIG. 9 shows an illustrative screen of a graphical user interface according to an embodiment of the present invention.

FIG. 10 shows an illustrative screen of a graphical user interface of a graphical user interface according to an embodiment of the present invention.

DETAILED DESCRIPTION OF EMBODIMENTS

Disclosed is a computer-implemented search method and computer-implemented agent system for efficient searching of information. Information may be located, for example, on the world wide web, semantic web, internet, an intranet, or other like computer network systems.

The disclosed computer-implemented search method and computer-implemented agent system can enable users to perform ontology-guided semantic searches for relevant information, both in-house and external-source. It can access heterogeneous data sources via agent-based knowledge services and can refine those searches based on user feedback. External sources include, but are not limited to, the World Wide Web, XML-databases, relational databases and the Semantic Web. Open standards for both ontology construction—the Web Ontology Language (OWL)—and for searching heterogeneous data sources—Web services, may be used in the disclosed computer-implemented search method and computer-implemented agent system.

Figure 1A:
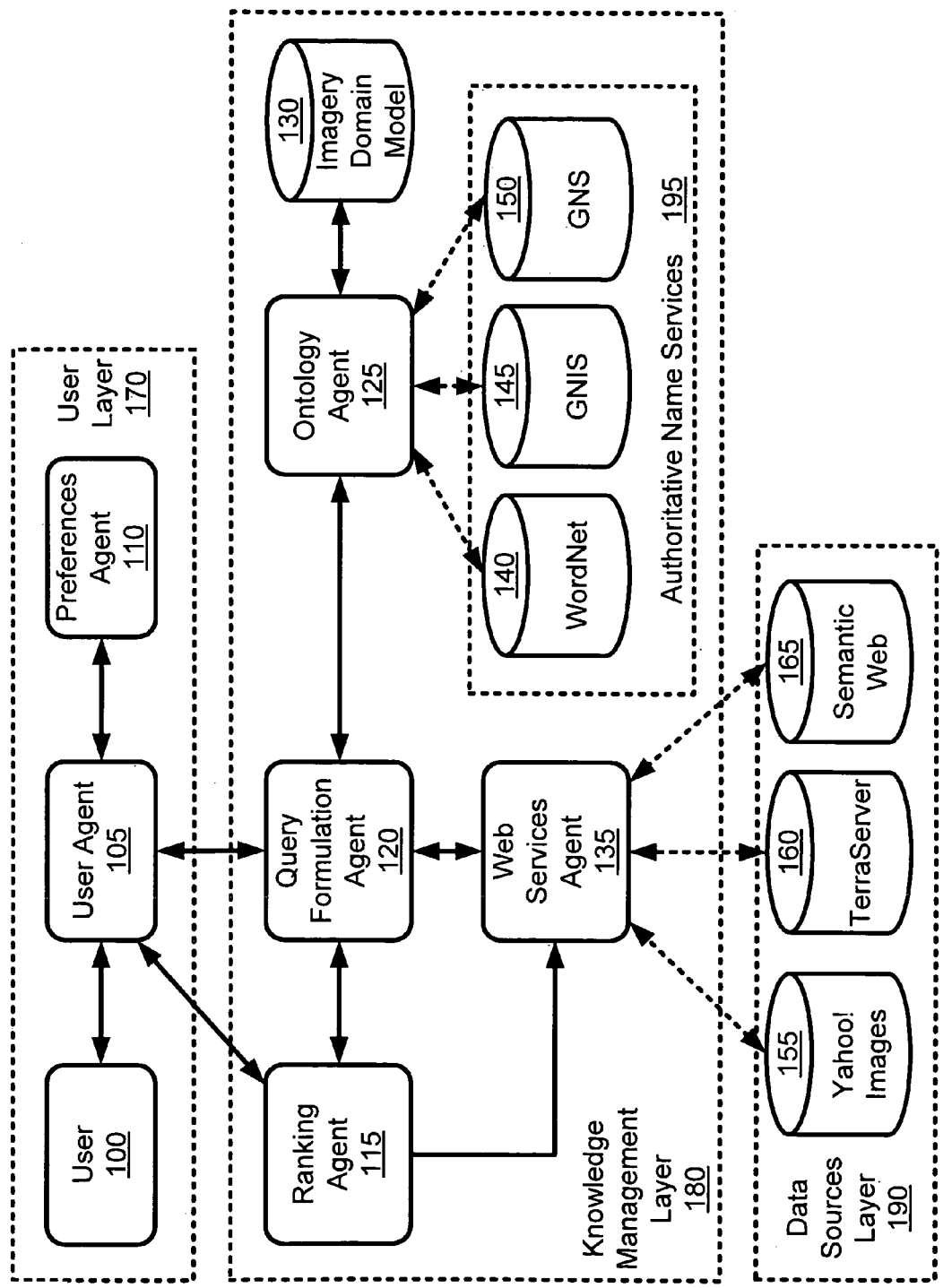
FIG. 1A is a block diagram of a system architecture according to an embodiment of the present invention.

Referring to FIG. 1A, a service-oriented system architecture (also referred to as the Knowledge Sifter architecture or "KS architecture"), comprised of a community of cooperating agents is shown, according to one embodiment. In FIG. 1A, the solid arrowed lines indicate Agent interaction and the flow of data, while the dashed arrowed lines indicate the flow of data. It should be noted that in other embodiments the interaction of flow can be in different directions. The architecture depicted can have three layers: User Layer 170, Knowledge Management Layer 180, and Data Sources Layer 190. The KS architecture may be general and modular so that new ontologies and new information resources can be incorporated easily, in a "plug-and-play" type-fashion. Specialized agents may reside at the various layers and perform well-defined functions. They can support interactive query formulation and refinement, query decomposition, query processing, result ranking and presentation. The various KS agents and services are further discussed below.

Figure 1B:
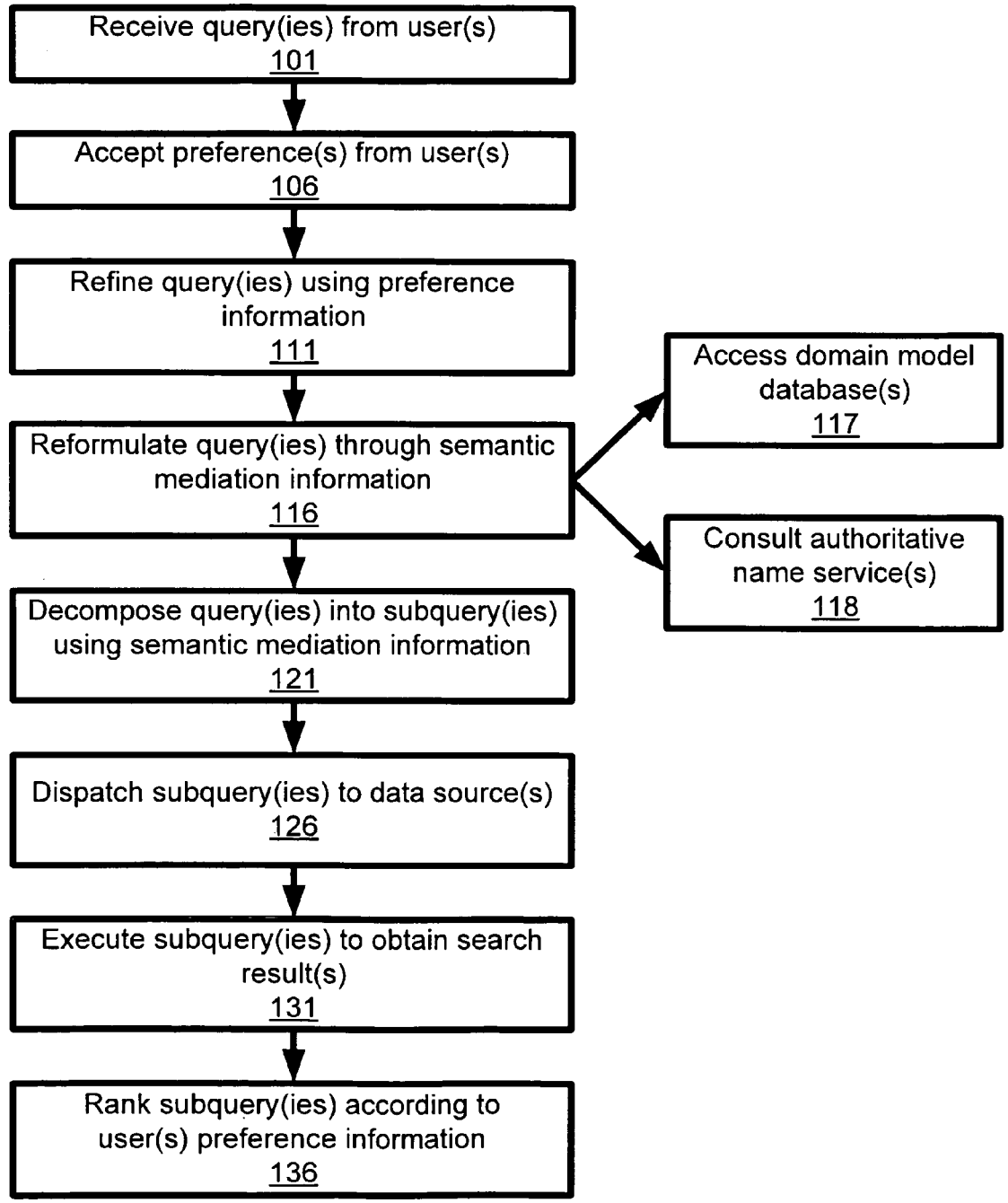
FIG. 1B is a flow chart that corresponds with the system architecture of FIG. 1A according to an embodiment of the present invention.

Referring to FIG. 1B, a general flow chart is shown that corresponds to the embodiment shown in FIG. 1A. The KS architecture can receive one or more queries from at least one user at 101. The KS architecture can also accept user preferences from the user at 106. The KS architecture can refine the user query using the user preferences at 111. The KS architecture can reformulate the query through semantic mediation information at 116. This can be done by accessing at least one domain model database at 117 and by consulting one or more authoritative name services at 118. The KS architecture can decompose the query into at least one subquery using the semantic mediation information at 121. The subquery can be dispatched to at least one data source at 126. Finally, the KS architecture can execute the subquery to obtain at least one search result at 131. Additionally, the KS architecture can rank the subquery according to the user's preference information at 136.

Referring again to FIG. 1A, the KS architecture is described in further detail according to each agent according to an embodiment. User agent 105 can receive information from a user 100 and obtain the user's 100 preferences. User 100 preferences may be stored and managed by the preferences agent 110. These preferences include, but are not limited to, the relative importance attributed to terms used to pose queries, the user-perceived authoritativeness of results obtained from data sources, and the biases a user has towards data sources.

In one embodiment, as shown in FIG. 10, the KS architecture can accept user preferences according to an image analysis information domain. A user can identify among other things: the relative importance to the user of the semantic description (name and description) 1005; the relative importance to the user of the location being searched 1010; the user's preferences relating to the date of an image 1015; the size of an imagery file 1020; the relative importance according to the theme of the image (such as a photograph or topographic map) 1025; and whether a particular data source (e.g., Terra Server or Yahoo!) 1030 is preferred over another. The user can indicate his or her preferences utilizing a graphical user interface. For example, a pull-down menu may be used to indicate the user's preferences utilizing a rating scale from zero to ten.

Referring again to FIG. 1A, the user preference information may also be used by the ranking agent 115. Further, the preferences agent 110 can also learn the user's 100's preferences based on experience and feedback related to previous queries. One skilled in the art would appreciate that the type of information sought from the user could be modified according to the type of information domain. For example, a domain model based on media such as movies, music, and the like might request preferences according to the year of the media, the popularity of the item, its content, or a particular genre.

Referring to additional agents depicted in FIG. 1A, the ontology agent 125 can access an imagery domain model 130. As previously discussed, domain models other than an imagery domain model may be supported by the KS architecture. The KS architecture can also be configured to support multiple domain models simultaneously and can have linkages among the models. For example, multiple domain models may include domain models relating to movies, music, and soundtracks. In addition, authoritative name services 195 may provide data to the ontology agent to suggest query refinements. As shown in FIG. 1A, authoritative name services 195 include, but are not limited to, Princeton University's WordNet 140, the U.S. Geological Survey's Geographic Names Information System (GNIS) 145, and the National Geospatial-Intelligence Agency's GEOnet Names Server (GNS) 150. The authoritative name services 195 can enable the ontology agent 125 to use terms provided by the authoritative name services 195 to suggest query refinements such as generalization, specialization and synonyms. For example, WordNet 140 can provide a collection of synonyms or synonym sets for a term, while GNIS 145 and GNS 150 translate a physical place name—in the United States and the World, respectively—into latitude and longitude coordinates that are required by a data source such as TerraServer. Other appropriate name and translation services can be added in a modular fashion, and the domain model 130 can be updated to accommodate new concepts and relationships.

When the initial query instance, specifying a person, place, or thing, is sent to the ontology agent 125, it can then consult WordNet 140 to retrieve synonyms. The synonyms may be provided to the query formulation agent 120 to request that the user 100 select one or more synonyms. The decision may be communicated to the ontology agent 125 which then updates the appropriate attribute in the instantiated version of the OWL schema. If the attribute value is the name of a class of type place then the ontology agent 125 may pass the instance to the both GNIS 145 and GNS 150. These take the place name as input and can provide the latitude-longitude coordinates as output. This information can then be communicated to the query formulation agent 120 which then forwards the information in the reformulated queries to the web services agent 135 for processing.

The user agent 105 may be configured to pose an initial query to the query formulation agent 120. This agent, in turn, can also consult the ontology agent 125 to refine or generalize the query based on the semantic mediation provided by the available ontology services. Once a query has been specified by means of interactions among the user agent 105 and the ontology agent 125, the query formulation agent 120 decomposes the query into subqueries targeted for the appropriate data sources. This involves semantic mediation of terminology used in the domain model ontology and name services with those used by the local sources. Also, query translation may be needed to retrieve data from the intended heterogeneous sources.

The web services agent 135 may be configured to accept user 100 queries that have been refined by consulting the ontology agent 125, and decomposed by the query formulation agent 120. The web services agent 135 can arrange, compose and dispatch subqueries to appropriate data sources, taking into consideration facets including but not limited to: user preference of sites; site authoritativeness and reputation; service-level agreements; size estimates of subquery responses; and quality-of-service measures of network traffic and dynamic site workload.

The ranking agent 115 may be configured to be responsible for compiling the sub-query results from the various sources, ranking them according to user preferences, as supplied by the preferences agent 110, for attributes including but not limited to: 1) the authoritativeness of a source which is indicated by a weight—for example, a number between 0 and 10—assigned to that source, or 2) the weight associated with a term comprising a query.

As shown in FIG. 1A, data sources can include, but are not limited to, data sources such as Yahoo! Images 155, TerraServer 160, and Semantic Web 165. The data sources can be consulted by the web services agent 135. Yahoo Images 155 supports Representational State Transfer (REST)-based web services which simply returns XML result data over HTTP. Yahoo Images 155 can support the name and description for images; this can allow the ranking agent 115 to perform more precise evaluation for the semantic criteria. The ranking agent 115 may also use the size of images contained in Yahoo Images 155 metadata to filter images based on user preference, but the metadata may not contain the creation time of images which is a good measure of temporal aspect.

The KS architecture workflow may be configured to manage the entire search process, including, but not limited to, query specification, query reformulation, query decomposition, web service selection, data source selection, results ranking and recommendation presentation. Thus, the KS architecture can execute the subquery to obtain at least one search result. The KS architecture workflow may be carried out in part or entirely through the use of a physical, i.e., tangible, computer readable storage medium. Examples of machine-readable storage media include, but are not limited to, (a) magnetic disks, cards, tapes, and drums, (b) punched cards and paper tapes, (c) optical disks, (d) barcodes (e) solid state memory devices or (f) magnetic ink characters.

Search results may be displayed to a user in response to a user query according to an embodiment of the KS architecture. A search result may be shown on a map display such as a Google map display. So for example, The KS architecture displaying a map display of Mount Rushmore in South Dakota in response to the search query "Rushmore, Mount". In response to the broader search query "Rushmore", the KS architecture could show a result for "Rushmore Farm" in Zambia. Additionally, image search results from image databases such as TerraServer and Yahoo! May be displayed for search queries. For example, a search query for "Rushmore, Mount" could result in a series of pictures of Mount Rushmore in South Dakota.

Figure 2:
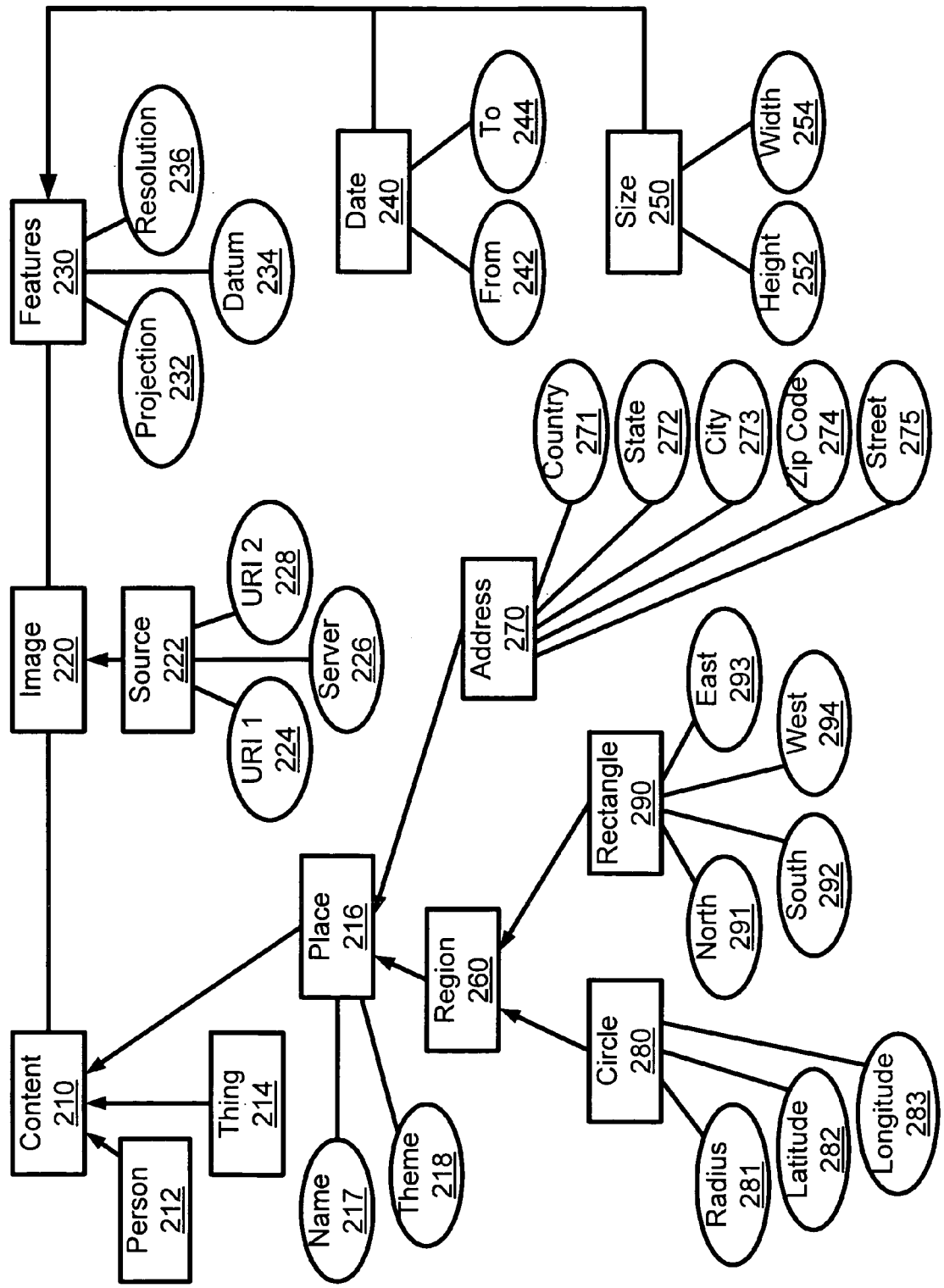
FIG. 2 is a block diagram of an imagery domain ontology model according to an embodiment of the present invention.

FIG. 2 shows a block diagram according to an embodiment of an imagery domain ontology model. As depicted in FIG. 2, the domain model can be specified in a web ontology language (OWL) and the imagery domain ontology can represent the conceptual model for images. Specifically, FIG. 2 depicts various class and property attributes according to the imagery domain model 130 from FIG. 1A. Rectangles indicate class relationships, while ovals indicate properties. A one-to-many relationship can exist between image 220 and content 210, and image 220 and features 230. Solid arrowed lines indicate an ISA relationship. For example, an ISA relationship is shown between circle 280 and region 260.

Referring again to FIG. 2, an image 220 can have a source 222, with respective property attributes URI 1 224, URI 2 228, and server 226. Content 210 can have person 212, thing 214, and place 216. Class place 216 can have properties name 217 and theme 218, and classes region 260 and address 270. Class region can further have class circle 280 and class rectangle 290. Class circle 280 can have property attributes radius 281, latitude 282, and longitude 283. Class rectangle 290 can have property attributes north 291, south 292, east 293, and west 294. Class address 270 can have properties country 271, state 272, city 273, zip code 274, and street 275. Class features 230 can have properties projection 232, datum 234, and resolution 236. An ISA relationship can also exist between features 230 and date 240, and between features 230 and size 250. Class date 240 can have properties from 242 and to 244. Class size 250 can have properties height 252 and width 254. Various other classes, properties and ISA relationships could be utilized and will be apparent to those skilled in the art. Of course, domain models other than an imagery domain model will accordingly utilize class types and properties appropriate for that domain model. For example, a domain model based on movies may have a class type such as rating, with properties such as G, PG, PG-13, or R.

In another embodiment the KS architecture may be configured to analyze emergent behavior and patterns through the agent system and the use of composable web services to create reusable search frameworks. The KS architecture may be configured to collect, index, organize and store significant artifacts created during the end-to-end workflow.

Figure 3A:
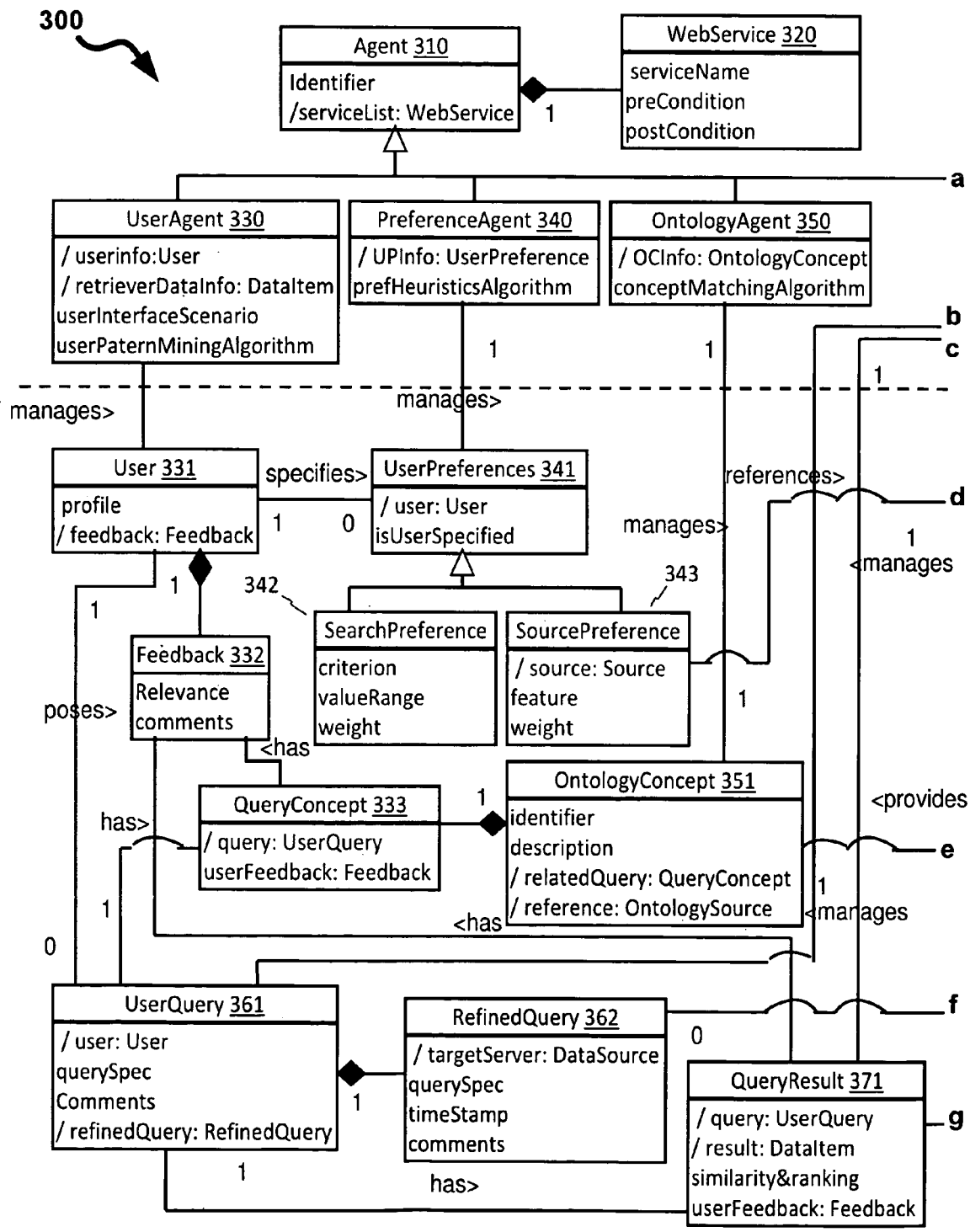
FIGS. 3A and 3B show partial views, that when combined show a block diagram of a UML Static Model according to an embodiment of the present invention.
Figure 3B:
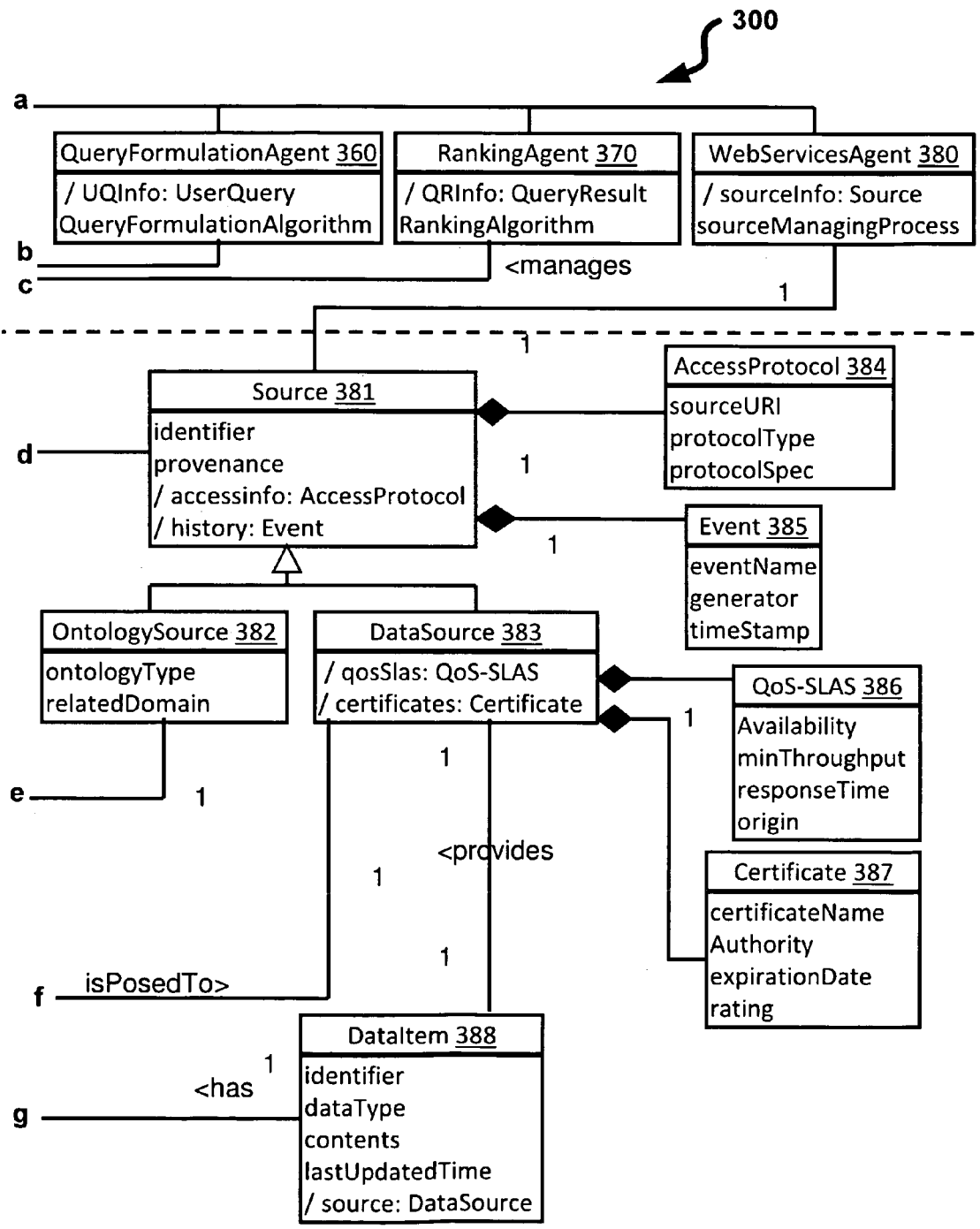

FIGS. 3A and 3B show partial views, that when combined, show a block diagram of an UML Static Model 300 according to an embodiment of the KS architecture. Referring to FIGS. 3A and 3B, the Knowledge Sifter Meta-Model (KSMM) 300 depicts the UML Static Model for the KSMM 300 further illustrating the agents, classes, their relationships and properties. At the top is the class Agent 310, which can be composed of WebService 320. Agent 310 may be specialized to various agents in the KS architecture, such as the UserAgent 330, PreferencesAgent 340, OntologyAgent 350, QueryFormulationAgent 360, RankingAgent 370, and WebServicesAgent 380. These agents may be configured to manage their respective object classes, process specifications, and WebService 320. For example, the UserAgent 330 can manage the User Class, the UserinterfaceScenario, the User PatternMiningAlgorithm, and the WebService 320. The User 331 may be configured to specify UserPreferences 341 that can be specialized to Search Preferences 342 and Source Preferences 343. The User 331 can pose UserQuery 361 that may have several QueryConcept 333, which in turn relates to an OntologyConcept 351. The OntologyAgent 350 may be configured to manage both the UserQuery 361 and the OntologyConcept 351 that can be provided by an OntologySource 382. Both OntologySource 382 and DataSource 383 can be specializations of Source 381. Source 381 may be managed by the WebServicesAgent 380 and can have attributes such as provenance, coverage, access protocol (Access Protocol 284) and history (Event 385). DataSource 383 may have attributes such as Quality-of-Service Service-Level-Agreements (QoS-SLAS) 386 and Certificate 387.

A UserQuery 361 may be configured to consist of several RefinedQuery 362, each of which can be posed to several DataSource 383. DataSource 383 can provide one-or-more DataItem 388 in response to a RefinedQuery 362 as the QueryResult 371. Based on the returned QueryResult 371, the User 331 may provide Feedback 332 as to the result relevance and other comments. These may impact the evolution of metadata associated with UserPreference 341, query formulation, data source usage and result ranking. The KSMM 300 can be implemented as a relational database schema, which can be used to organize, store and interrelate the artifacts associated with a user query. The data can then be mined for emergent properties related to the use of the disclosed computer-implemented search method and computer-implemented agent system.

Figure 4A:
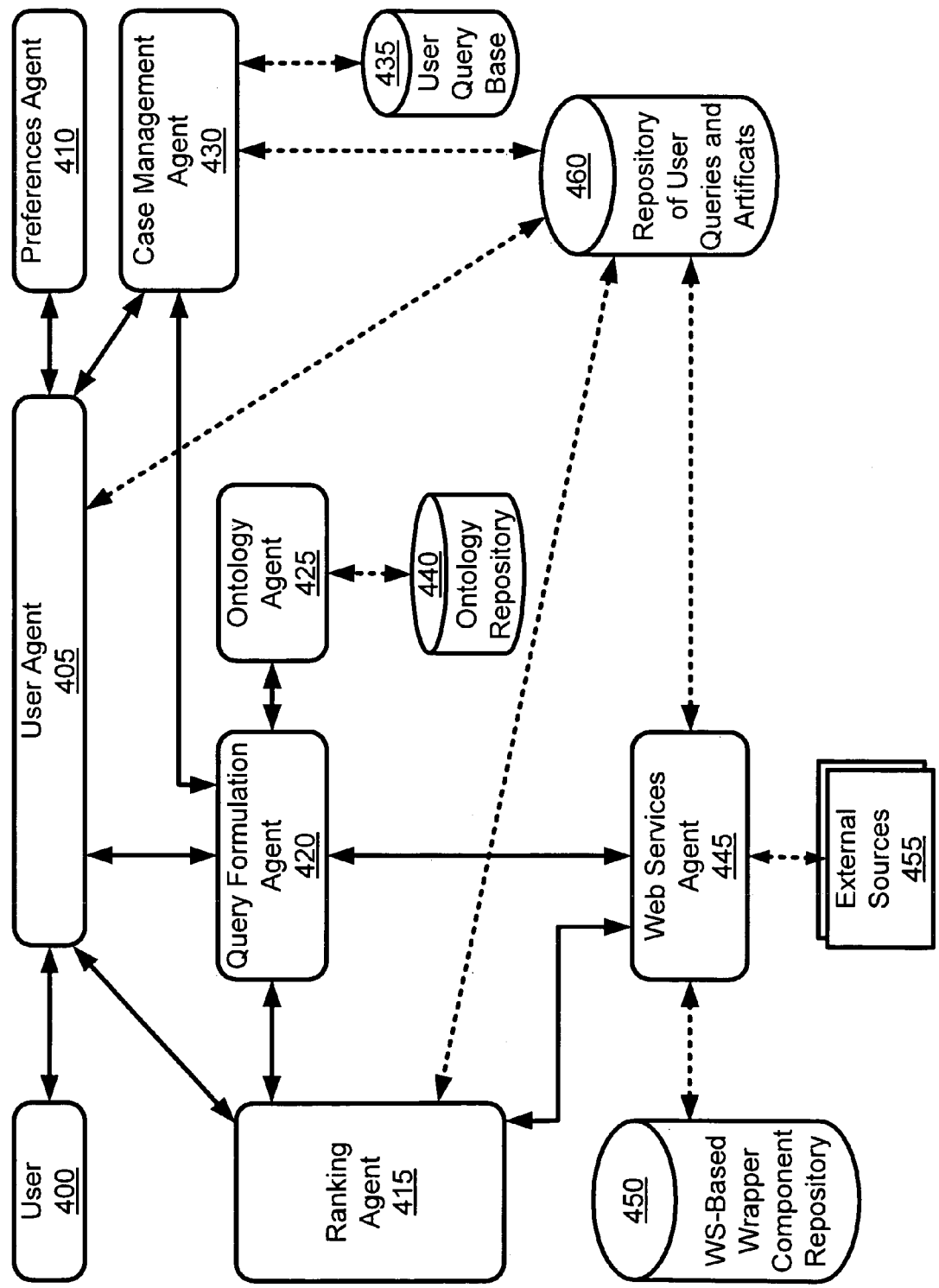
FIG. 4A is a block diagram of a system architecture according to an embodiment of the present invention.

FIG. 4A shows a block diagram of a system architecture according to an embodiment of the present invention. Specifically, FIG. 4A depicts an embodiment according to a case-based framework using the KS architecture which may be configured to recommend query specifications and refinements based on previously-stored user-query cases. Characteristics common to agents previously discussed with respect to FIG. 1A are not repeated for the sake of brevity.

Figure 4B:
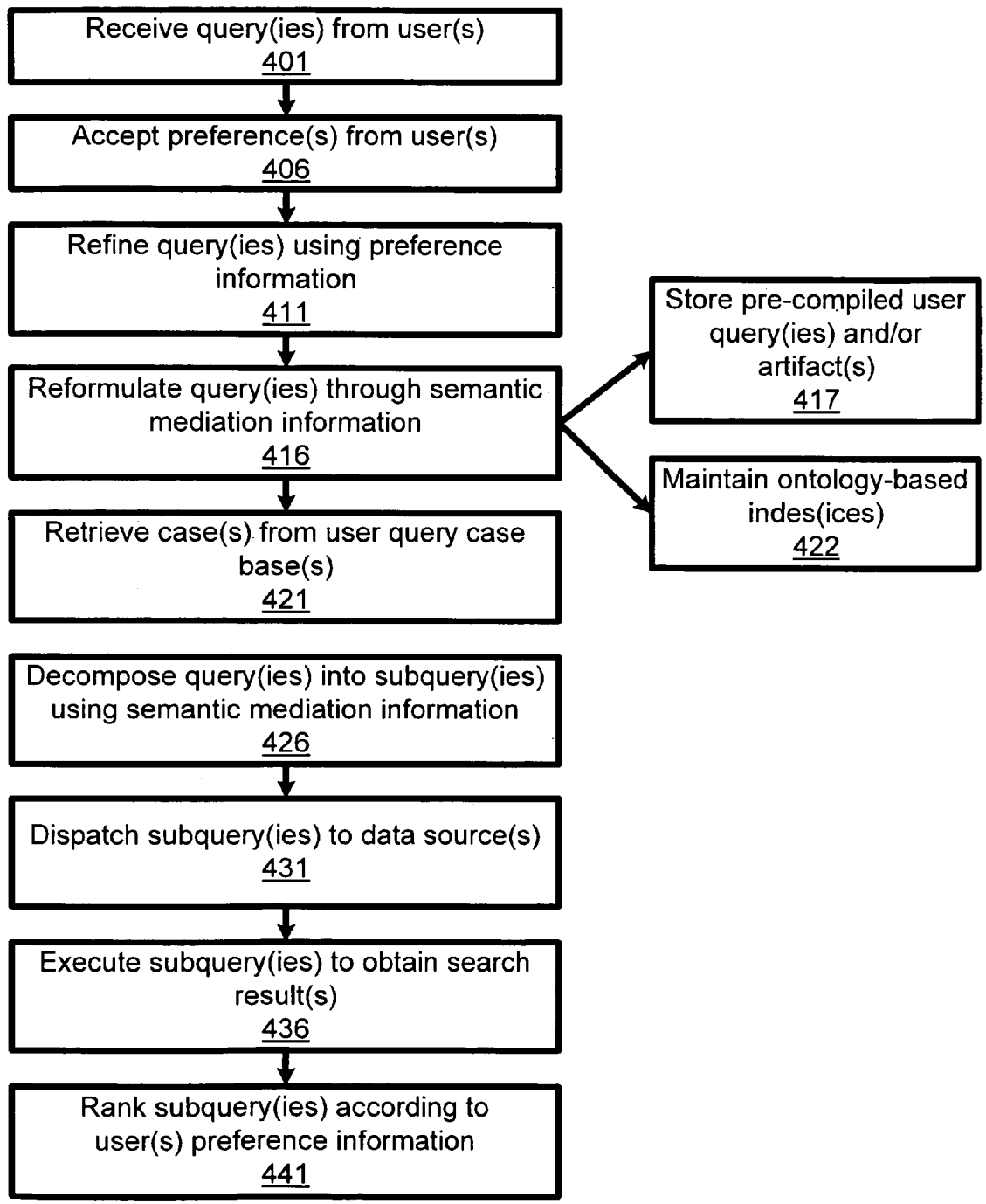
FIG. 4B is a flow chart that corresponds with the system architecture of FIG. 4A according to an embodiment of the present invention.

FIG. 4B is a general flow chart of a system architecture corresponding to the embodiment illustrated in FIG. 4A. The KS architecture can receive at least one query from at least one user at 401. The KS architecture can also accept user preferences from the user at 406. The KS architecture can refine the user query using the user preferences at 411. The KS architecture can reformulate the query through semantic mediation information at 416. The KS architecture can maintain a pre-compiled component repository and/or artifacts at 417. The KS architecture can also retrieve at least one case from at least one user query case base at 421, and can efficiently manage cases by maintaining at least one ontology-based index at 422. The KS architecture can decompose the query into at least one subquery using the semantic mediation information at 426. The subquery can be dispatched to at least one data source at 431. Finally, the KS architecture can execute the subquery to obtain at least one search result at 436. Additionally, the KS architecture can rank the subqueries according to the user's preference information at 441.

Referring again to FIG. 4A, the KS architecture is described in further detail according to specific agents. The case management agent 430 may be configured to communicate with the user agent 405 and can obtain cases from the user query case base 435 that have user feedback annotations. The case management agent 430 can also communicate with the repository 460.

A user query case can be generated when a user 400 provides relevance feedback for results returned for a query. The user feedback may be the user's evaluation of the degree of relevance of a result to the refined query. For example, the degree of relevance may be rated as highly relevant, relevant, highly not relevant, or unclear. One skilled in the art would appreciate that other rating scales could be implemented, such as a numbered rating system, or letter grades for example. The relevance feedback can also be regarded as a user rating of the result's information quality.

The query formulation agent 420 may be configured to communicate with the ranking agent 415 and ontology agent 425. The ontology agent 425 can also be configured to communicate with an ontology repository 440. Additionally, the query formulation agent 420 may be configured to communicate with the case management agent 430 to retrieve cases according to a user query and user preferences (managed by the preferences agent 410). To efficiently retrieve cases, the case management agent 430 may be configured to maintain ontology-based indices to cases, described below with respect to FIG. 5. From the retrieved cases, a refined query with data source information can be selected using a collaborative filtering approach which is also described below. The KS architecture according to the embodiment of FIG. 4A can also maintain a pre-compiled component repository 460 for accessing data sources for each information domain such as places, music, movies, scholarly papers, etc. Based on the collaborative filtering approach, the KS architecture can semi-automatically select external data sources 455. The web services agent 445 may be configured to communicate with a dynamically configured web services-based wrapper component repository 450 for each selected external data source 455.

Figure 5:
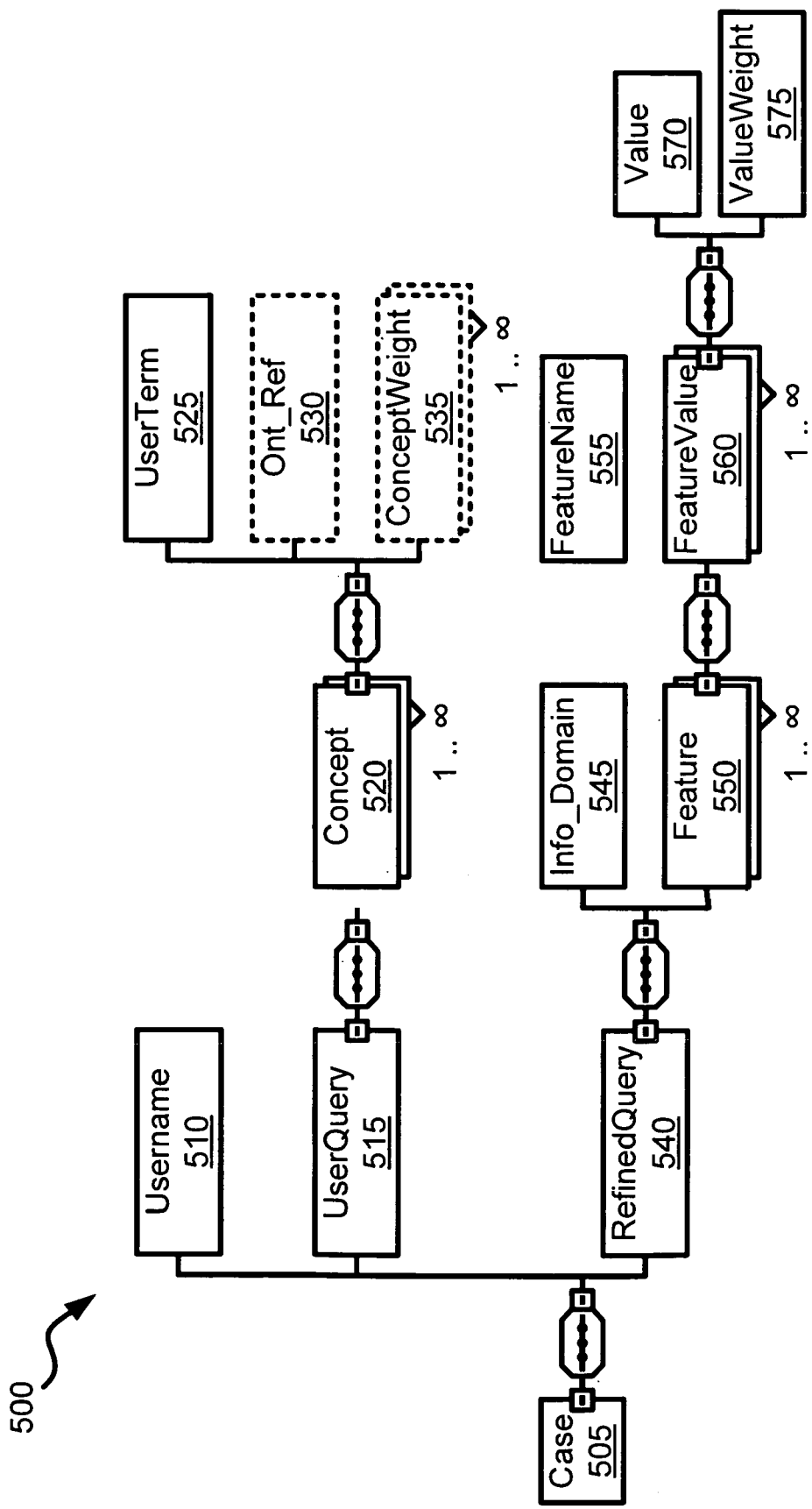
FIG. 5 is a block diagram of an XML-based semantic model according to an embodiment of the present invention.

FIG. 5 shows a block diagram of an XML-based semantic model according to an embodiment of the present invention. Referring now to FIG. 5, an XML-based structure 500 is shown for a case representing a user query and its artifacts. A case 505 may contain a username 510 to identify its user, and this user identifier can be used to perform collaborative filtering and to retrieve the user's preferences. Also, each case may have an associated user query 515 and multiple refined queries 540, because the KS architecture generates a refined query for each information domain. A user query 515 can have multiple concepts 520 which consist of a user term 525, multiple ontology references 530, and a weight 535. For example, suppose one wished to visit the Washington Monument and then dine at a steakhouse in D.C. In this example, the keyword terms in a query might be "Washington monument" and "steakhouse." The ontology reference 530 can be a concept identifier in an ontology which contains the concept. WordNet can be employed as a general upper ontology and several domain specific ontologies such as places, restaurants, and wine can be linked and used to represent user concepts. This referenced ontology concept can serve as an index of the user query as described below with respect to FIG. 6. The concept weight 535 may represent a degree of importance the user assigns to a concept. A refined query 540 may have one or more information domains 545 for which the query is specified. The refined query 540 may be a weighted multi-dimensional/multi-valued query as shown in FIG. 5. The refined query 540 can be configured so that the schema can be extended to include new features 550. Feature 550 may be composed of variables FeatureName 555, FeatureValue 560 and FeatureWeight 565. The FeatureName 555 can also be a variable since the schema of a refined query 540 will be determined by its information domain and the user-selected data source. By way of example, the FeatureName 555 of the refined query 540 could be data source information and could be represented as FeatureName: data-source. The FeatureValue 560 may be a web site such as IMDB.com, where IMDB denotes the Internet Movie Data Base, and could be represented as FeatureValue: imdb.com. Web sites such as Google or Yahoo! could represent other FeatureValues 560. The FeatureWeight 565 of the refined query 540 can be a value that represents the importance of the feature 550 to the user, and can be determined by an algorithm discussed later. Additionally, a Value 570 and ValueWeight can be associated with the FeatureValue 560. The FeatureValue 560 can be configure so that the schema can be extended to include variables other than Value 570 and ValueWeight 575.

Thus, a feature can be not only content-based metadata, but also metadata created during the information object's lifecycle. The feature name 555 may be standardized in the scope of the KS architecture to remove the ambiguity which can occur during the search and recommendation processes described below. Some standardized metadata, such as Dublin Core Metadata, can be used to describe feature attributes.

As mentioned previously, to efficiently retrieve cases, the case management agent 430 may be configured to maintain ontology-based indices for cases. Referring again to FIG. 5, each user term 525 of the query concept can have referenced ontology concepts 520. For each ontology concept 520, case identifiers referencing the ontology concept 520 can be stored as the indices. Other elements in connection with the RefinedQuery 540 of FIG. 5 are described in further detail later.

Figure 6:
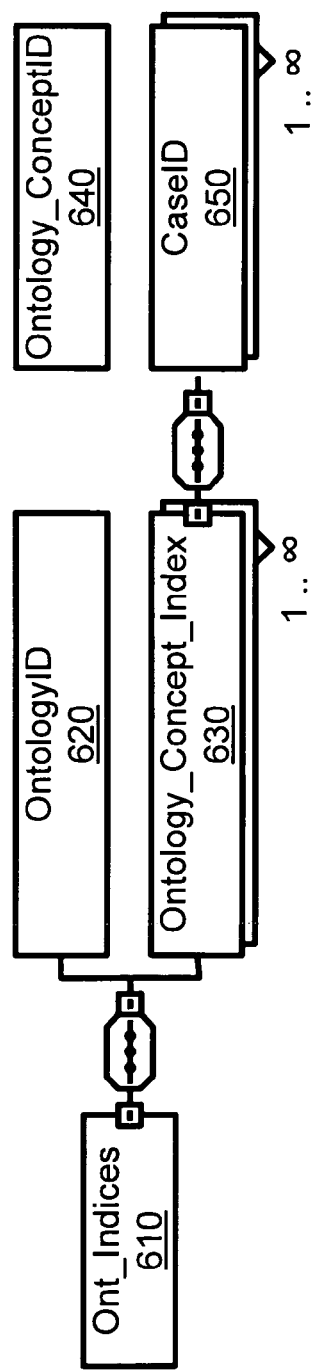
FIG. 6 is a block diagram of an XML-based semantic model according to an embodiment of the present invention.

FIG. 6 shows a block diagram of an XML-based semantic model according to an embodiment of the present invention. Referring to FIG. 6, a simple index structure 610 for an ontology is depicted, which may have an ontology identifier 620, several concept indices 630 consisting of ontology concept identifiers 640 of that ontology, and case identifiers 650 for each of the ontology concepts. This approach can allow for efficient retrieval of similar cases because it explores related ontology concepts first, rather than navigating a large number of the user query cases.

Figure 7B:
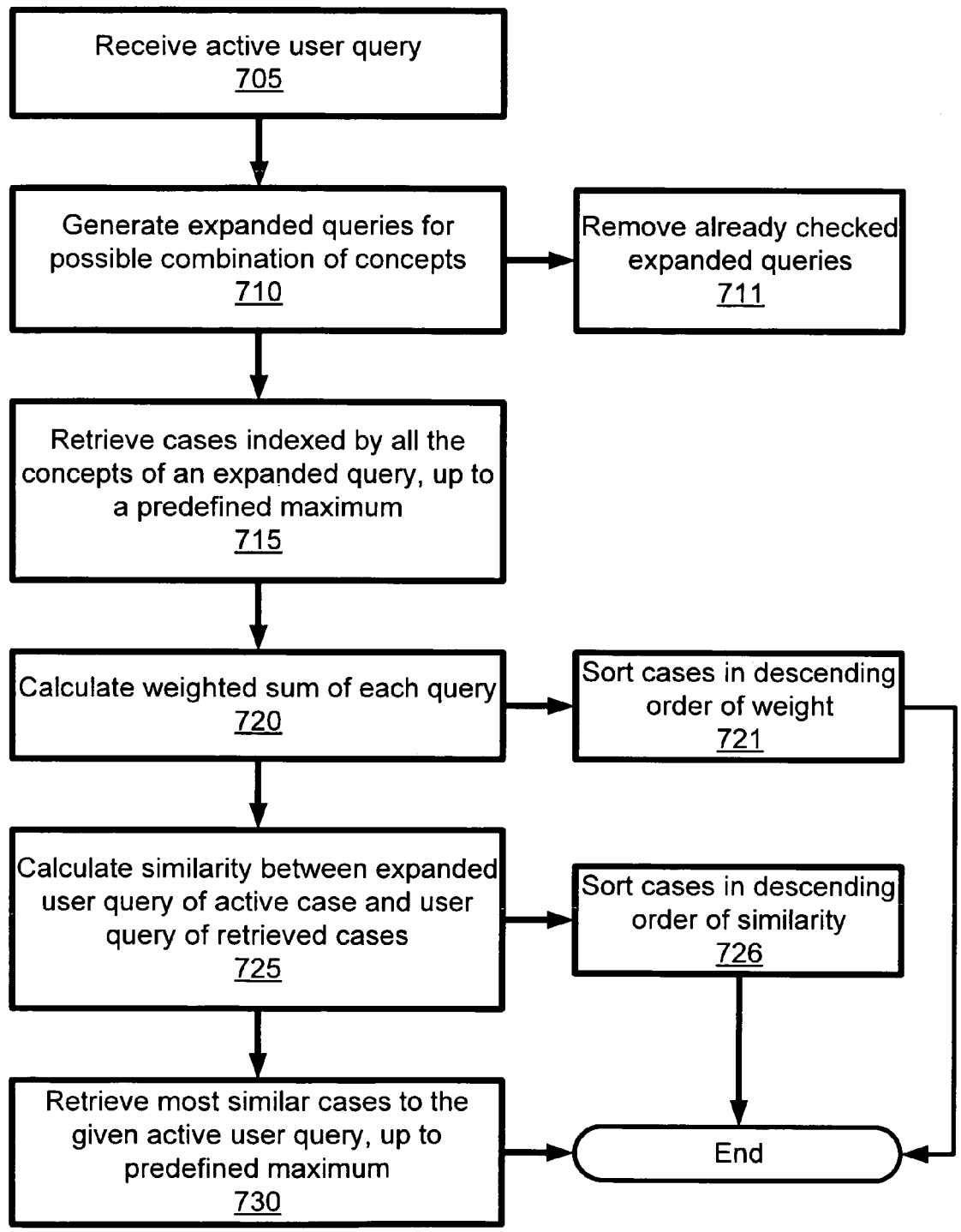
FIG. 7B is a flow chart of a case retrieval algorithm corresponding to FIG. 7A according to an embodiment of the present invention.

Referring to FIG. 7A shows an algorithm for retrieving cases similar to the user query via ontology-based indices. FIG. 7B shows a general flow chart that corresponds to the algorithm shown in FIG. 7A. Brackets and reference characters shown in FIG. 7A correspond to the flow chart and reference characters shown in FIG. 7B.

Referring to FIG. 7B, first, an active user query is received at 705. The algorithm can then generate expanded queries of every possible combination of concepts, including their equivalent and generalized concepts at 710. For example, a user query {Washington Monument, steakhouse} can be expanded via ontology navigation as: {Washington Monument, chophouse} {Washington Monument, restaurant} {DC, steakhouse}, etc. The DC concept may be obtained from WordNet through the "Part Holonym" relationship of the "Washington Monument" concept to the "DC" concept, and this can be regarded as a spatial generalization.

The algorithm can retrieve cases which are indexed by all the concepts of an expanded query, but can also limit the number of the cases to a prespecified maximum at 715. For efficiency purposes, whether the required number of cases is retrieved or not will be checked before expanding one element query of powerset of the user query because the expanded queries generally cannot be more similar to the user query than the original element query. Thus, the algorithm can remove already checked expanded queries to find cases before generating the next combination at 711. The weighted sum of each query, w(uqi), and shown at 720, can be calculated as follows:

$$w(uq_i) = \sum_j tw(c_{ij}) \cdot uw(c_{ij}) \quad (1)$$

$$w(c_{ij}) = \begin{cases} 1.0, & \text{if } c_{ij} \text{ is a user concept} \\ syw, & \text{if } c_{ij} \text{ is an equivalent concept of the user concept} \\ hyw, & \text{if } c_{ij} \text{ is a generalized concept of the user concept} \\ syw * hyw, & \text{if } c_{ij} \text{ is a generalized concept of the equivalent concept} \end{cases}$$

The term $uq_i$ may represent a user query for case i and $tw(c_{ij})$ may represent a predefined weight for the type of jth concept in $uq_i$. The terms syw and hyw can denote the predefined weight for an equivalent (synonym) concept and a generalized (hypernym) concept, respectively. The term $uw(c_{ij})$ may be a user defined weight for a concept $c_{ij}$. The algorithm can sort cases in descending order of weight at 721.

A similarity, at 725, between the expanded user query of the active case and the user query of the retrieved cases, which can be expressed as $sim(C_a, C_i)$ uses cosine correlation which is widely used for the vector model in information retrieval. The term $sim(C_a, C_i)$ can be calculated as follows:

$$sim(C_a, C_i) = \frac{\sum_{j \in EQ_a} cw_{aj} \cdot cw_{ij}}{\sqrt{\sum_{j \in EQ_a} cw_{aj}^2} \cdot \sqrt{\sum_{j \in EQ_a} cw_{ij}^2}} \quad (2)$$

The terms $cw_{aj}$ and $cw_{ij}$ can represent the weights of the jth concept in the expanded user query of the active case $EQ_a$ and the user query of the retrieved case respectively. The algorithm can sort cases in descending order of similarity at 726.

The algorithm can retrieve the most similar cases to the given active user's query at 730. The number of similar cases retrieved can be limited to a predefined maximum.

Content-based filtering may serve as a method for recommending unseen items to a user based on the contents of items the user has already seen and which may stored in their profile. Content-based filtering can assist users in refining a query based on the artifacts of their past queries which are similar to the active query. However, similar queries may not yet exist in the active user's profile, or the acceptable number of the user-preferred data items cannot be easily obtained because of insufficient feedback data provided thus-far. Referring again to FIG. 4A, an embodiment is now discussed according to a case-based framework using the KS architecture which may be configured to utilize collaborative filtering.

The KS architecture may be configured to utilize collaborative filtering may ameliorate the situation described above with respect to content-based filtering; it attempts to predict usefulness of as yet unseen items for an active user 400, by proposing items based on those previously rated by other users. The KS architecture can recommend a set of unseen items that are preferred by other users who have tastes similar to the active user 400. Thus, the drawbacks of content-based filtering can be addressed with a higher level of confidence.

However, collaborative filtering may not be applied directly to the case-based KS architecture framework discussed above, because more than one user-query case, stored in the case repository, may be similar to the active user query. One approach may be to recommend a single aggregated refined query from the cases having a certain level of user-query similarity. The similarity $sim(C_a, C_i)$, discussed above, may be calculated as the similarity between the active case and its similar cases in terms of the similarity of the user queries.

Therefore, a hybrid filtering approach can be used effectively in the KS architecture which combines both collaborative filtering and content-based filtering. However, if there is no previously-stored user query posed by the active user in the selected similar cases, the collaborative filtering cannot be directly used for the active refined query because the recommendation of the query specification should be made before retrieving results from data sources. In other words, no user feedback exists on results of the query which is required for the collaborative filtering. To address this problem, an aggregated refined query from the refined queries of the selected cases can be recommended.

The case-based KS architecture can recommend the refined query and the user 400 can confirm that this is to now be the active refined query. During this confirmation, the user 400 can fine-tune the query parameters. For example, for the data source feature, the user might add or remove data sources and adjust the weights for each data source. Then, the KS architecture can retrieve results from the data sources 455 in the user-confirmed refined query by dynamically translating it (via the Web Service (WS)-based wrapper component repository 450) to one or more queries according to each data source's schema/ontology. The active user 400 can provide feedback on some results and can request another recommendation of the specification. Collaborative filtering can then be used because the artifacts of the active refined query will have been stored in the case base 435 as a new case. It can then be selected as a similar case because the case's user query would be identical to the current specification of the active user query.

Referring to FIG. 9, an illustrative screen according to an embodiment of a graphical user interface is shown. The KS architecture and agent system may be configured to provide for a graphical user interface to allow for interaction with an active user, as well as to display results to an active user. For example, a user can enter a search query at 905. A user can also specify a certain number of image results to display at 910. GNIS results may be shown in section 915, and GNS results can be shown at section 920. The results may display information such as the location of the result by longitude and latitude. Obtaining user rating values for result data items of the active refined query can allow the active user's rating value for unseen data items to be predicted for the active refined query and neighbor refined queries which can be found from the KS architecture repository 460.

This embodiment of refined query-based collaborative filtering approach can allow the KS architecture to show the unseen data items immediately because the data items can be found in a neighbor's search history in the repository 460. The mismatch problem between user queries and refined queries can be alleviated by using a threshold for the similarity between the active refined query and neighbor refined query. For example, only the neighbor refined query having a certain high similarity value would be selected for the prediction process.

The active user's rating value for unseen data items prediction can be calculated from (3) and (4), shown below, derived from the collaborative filtering approach used in GroupLens.

$$p_{rq_{ad},dt_u} = \overline{r_{rq_{ad}}} + \frac{\sum_{i \in NC} (r_{rq_{id},dt_u} - \overline{r_{rq_{id}}}) \cdot sim(rq_{ad}, rq_{id}) \cdot sim(C_a, C_i)}{\sum_{i \in NC} |sim(rq_{ad}, rq_{id})| \cdot sim(C_a, C_i)} \quad (3)$$

$$sim(rq_{ad}, rq_{id}) = \frac{\sum_{s \in SD} (r_{rq_{ad},dt_s} - \overline{r_{rq_{ad}}}) \cdot (r_{rq_{id},dt_s} - \overline{r_{rq_{id}}})}{\sigma_{rq_{ad}} \cdot \sigma_{rq_{id}}} \quad (4)$$

Figure 8B:
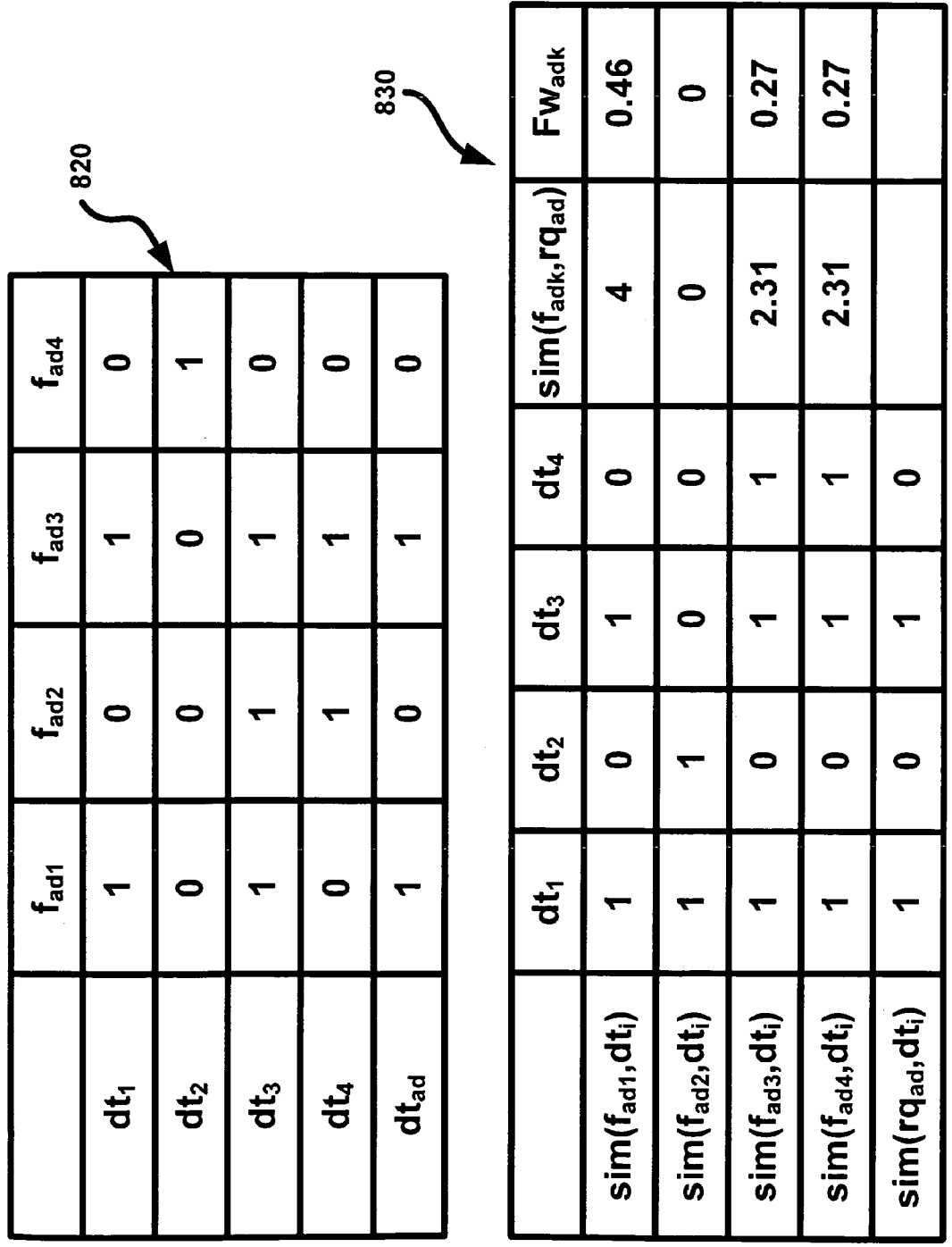
FIG. 8B shows a table of a feature weight adjustment using a multiple weighted-valued query according to an embodiment of the present invention.

The term $p_{rq_{ad},dt_u}$ can represent a prediction for an unseen (unrated) data item $dt_u$ for the active refined query $rq_{ad}$. The term $rq_{ad}$ can represent a refined query for the active user case for the domain d. The term $sim(rq_{ad}, rq_{id})$ can represent the correlation weight for user rating patterns of the refined queries $rq_{ad}$ and $rq_{id}$ as defined by the Pearson Correlation Coefficient shown in (4). The term $sim(C_a, C_i)$ can represent the similarity between the active case $C_a$ and a neighbor case $C_i$ as defined in (2). The term NC can be a set of neighbor cases selected as similar to the active case. The term SD can be a set of common seen (rated) items between $rq_{ad}$ and $rq_{id}$. The terms $r_{rqad}$ and $r_{rqid}$ can represent mathematical means for the ratings of the result data items of the queries $rq_{ad}$ and $rq_{id}$, respectively FIG. 8 shows a table 810 of a user rating prediction of unseen data items according to an embodiment using collaborative filtering via equations (3) and (4) above. Referring to FIG. 8, the table 810 depicts five seen items $dt_{si}$, which the active user rated for the active refined query $rq_a$. There are five unseen items $dt_{ui}$, which do not have a rating value for the active refined query from the active user, but have some rating values for the neighbor queries $rq_i$, not only by the active user, but also by other users. The unseen items are found via the case retrieval algorithm described above and shown in FIG. 7A. The rating values of data items on each query in the embodiment shown in FIG. 8 have binary rating values, but the equations can also work using various other rating scales. In the example shown in FIG. 8, the rating value 1 can represent that a user liked a data item and/or regarded the data item as relevant for a query, and 0 can represent the dislike and/or the irrelevance of the data item. The $sim(C_a, C_i)$ can represent the similarity value between the active case and a similar case in terms of its user query, and can be calculated using equation (2) above. The $sim(rq_a, rq_i)$ can represent the similarity between the active refined query and neighbor queries, and can be calculated from equation (4) above. Finally, the predicted rating values of the active refined query $rq_a$ for the unseen data items $dt_{ui}$ can be calculated by using equation (3) above. As can be seen from table 810, neighbor queries having higher similarities with the active refined query can have a greater influence in determining the prediction of the rating values. The absence of rating values for an unseen data item, (e.g., $dt_{u5}$) show that the formulas can also work well with sparse data.

Referring again to FIG. 5, which depicts an XML-based structure 500 for a case representing a user query and its artifacts, the refined query 540 will now be discussed in further detail. The KS architecture may be configured and adapted such that the active refined query 540 can be incrementally specified based not only on the data items rated by the active user, but also on the data items whose rating value is predicted from (3) and (4) above. The refined query 540 can be specified by content patterns of the rated data items and a new result set can be retrieved from a new data source set. More unseen data items can be found from above collaborative filtering with the new search artifacts. Thus, the refined query 540 can be incrementally specified by aggregating the rated and predicted data items.

The refined query 540 can be incrementally specified. First, the ValueWeight 575 for each feature 550 of the active refined query 540 can be calculated from (5) and (6), shown below. Then, the FeatureWeight 565 can be determined by (7) and (8), also shown below, which also uses the Pearson Correlation Coefficient. If the similarity value patterns for a criterion (feature) and the user rating patterns are similar, the feature would be an important factor (feature) for the user to determine the relevance of the data. Therefore, this approach also takes into account the negative examples which can have a negative feedback from users whereas content-based filtering systems may consider only the positive examples to refine queries in terms of weight adjustments. Furthermore, the negative correlation weight would become zero via the $n(x)$ function because the negative correlation would not necessarily mean that the user rated a data item as a relevant one since it is dissimilar to the query in the dimension of the feature or vice versa.

$$vw_{adfv} = \frac{\overline{r_{vv_{adfv}}}}{\sum_{l=1}^{m_{adf}} \overline{r_{vv_{adfl}}}} \quad (5)$$

$$\overline{r_{vv_{adfl}}} = \frac{\sum_{m \in MD} r_{rq_{ad}, dt_m} \cdot O(vv_{adfl}, dt_m)}{\sum_{m \in MD} O(vv_{adfl}, dt_m)} \quad (6)$$

$$fw_{adf} = \frac{n(sim(f_{adf}, rq_{ad}))}{\sum_{k=1}^{m_{ad}} n(sim(f_{adk}, rq_{ad}))}; \quad (7)$$

$$n(x) = \begin{cases} x & \text{if } x > 0 \\ 0 & \text{otherwise} \end{cases}$$

$$sim(f_{adk}, rq_{ad}) = \frac{\sum_{m \in MD}(sim(f_{adk}, dt_m) - \overline{sim(f_{adk})}) \cdot (r_{rq_{ad}, dt_m} - \overline{r_{rq_{ad}}})}{\sigma_{f_{adk}} \cdot \sigma_{rq_{ad}}} \quad (8)$$

The term $vw_{adfv}$ can represent the weight of the value $vv_{adfv}$ for a feature $f_{adf}$ of the query $rq_{ad}$. MD can be a set of data items representing the union of the set of the seen data items and the set of predicted unseen data items. The term $r_{vv_{adfv}}$ can represent an average rating value for data items in the set MD having a value $vv_{adfv}$. The term $O(vv_{adfl}, dt_m)$ can be a binary variable which represents whether the data item $dt_m$ has the value $vv_{adfl}$, and if yes, its value is 1, otherwise the value is 0. The term $sim(f_{adk}, rq_{ad})$ can represent the correlation weight between the criterion (feature) similarity and the original and predicted user ratings for the query $rq_{ad}$. The term $sim(f_{adk}, dt_m)$ can represent the similarity value between the values of the query $rq_{ad}$ and the data item $dt_m$ in terms of the dimension of the feature $f_{adk}$.

Referring to FIG. 8A, a table of a feature weight adjustment according to an embodiment using a multiple weighted-valued query is shown. The table in FIG. 8A depicts a feature weight adjustment using the multiple weighted-valued query generated only from the positive examples via (3) and (4) and increased user feedback information via the query-to-query collaborative filtering. The queries and data items in the embodiment shown in FIG. 8A have only binary values for each feature, but the equations would also work using actual values. The table 820 can represent the feature vectors of the query and data items. The table 830 can represent similarity values of the query and data items for each feature and rating values of the data items for the query. In this embodiment, the similarity value of the query and a data item for a feature can be 1 if they have the same value, otherwise it is 0. From the values depicted in table 820, one skilled in the art would appreciate that the feature $f_{adl}$ would be regarded as an important criterion for which the user determines the relevance of the data items; therefore, it would be beneficial to have a higher weight on the feature for the efficiency of the system's automatic rating/search process. This approach would be advantageous for adjusting criterion weights for the systems of using the weighted/multi-valued query-based and heterogeneous types of values in each criterion thereby requiring different metrics for evaluating the values.

The incrementally specified query can seem to degrade the prediction ratio and efficiency of the search process because it aggregates contents of multiple data items. However, clearly it can have better recall ratio. The prediction ratio can be alleviated by using the weights so that the results can be automatically rated and sorted by a similarity measure based on the weights. The efficiency problem can be caused if the refined query has more values because the number of data sources can be increased and some data sources do not provide multi-valued queries so that the refined query can be translated to a number of data source-specific queries. To address this problem, the translated queries having higher weight values can be posed in advance to a data source with a certain degree of parallel processing and the partial results can be shown to the users.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the disclosed embodiments should not be limited by any of the above described exemplary embodiments. In particular, it should be noted that, for example purposes, the above explanation has focused on a computer-implemented agent system and system architecture for efficient searching of information. Specifically, the agent system can have an ontology agent which can be utilized to access a domain model and authoritative name services to suggest query refinements. In another embodiment, a case management agent can be utilized to obtain cases from a user query case base to recommend query specifications and refinements. Content-based filtering, collaborative filtering, or a hybrid combination thereof, may be used by the KS architecture to further refine a query using ontology concepts. Where no previously-stored user queries exist, an aggregated refined query approach may also be used.

In addition, it should be understood that any figures which highlight the functionality and advantages, are presented for example purposes only. The disclosed architecture is sufficiently flexible and configurable, such that it may be utilized in ways other than that shown. For example, the actions or directional arrows listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

In this specification, "a" and "an" and similar phrases are to be interpreted as "at least one" and "one or more."

Many of the elements (including agents) described in the disclosed embodiments in this specification and the figures may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: processors; computers, microcontrollers, microprocessors, application-specific integrated circuits (ASICs); field programmable gate arrays (FPGAs); complex programmable logic devices (CPLDs); or combinations thereof or the like. Computers, processors, microcontrollers and microprocessors may be programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A non-transitory physical machine readable storage medium having stored thereon instructions that that when executed by one or more processors, causes the one or more processors to perform a method comprising:
   a. receiving at least one query from at least one user;
   b. accepting at least one user preference from the at least one user using at least one user processor;
   c. refining the at least one query using the at least one user preference using a refining processor;
   d. reformulating the at least one query through semantic mediation information using at least one ontology processor;
   e. retrieving at least one user query case similar to the at least one query from at least one user query case base using at least one case management processor;
   f. maintaining at least one ontology-based index using the at least one case management processor;
   g. storing at least one pre-compiled user query, or at least one artifact, or a combination thereof, in at least one repository;
   h. decomposing the at least one query into at least one subquery using the semantic mediation information utilizing at least one query formulation processor; and
   i. executing the at least one subquery in order to obtain at least one search result; and wherein the at least one case management processor retrieves the at least one user query case similar to the at least one query from the at least one user query case base using at least one algorithm using at least one ontology-based index; and
   wherein the at least one algorithm limits a number of user query cases retrieved to a predefined maximum.

2. The non-transitory physical machine readable storage medium of claim 1, wherein the method further comprises:
   a. dispatching at least one subquery to at least one data source using at least one web services processor;
   b. managing the at least one user preference using a preferences processor;
   c. ranking at least one subquery result according to user preferences using at least one ranking processor; and d. transmitting the at least one search result to the at least one user for displaying on at least one graphical user interface.

3. The non-transitory physical machine readable storage medium of claim 2, wherein the method further comprises:
   a. receiving feedback from the at least one user based on the at least one search result displayed;
   b. generating at least one user query case based on the feedback; and
   c. storing the at least one user query case in the at least one repository.

4. The non-transitory physical machine readable storage medium of claim 3, wherein the method further comprises recommending at least one data item to the at least one user based on:
   a. feedback from at least one prior user; or
   b. feedback from the at least one user; or
   c. any combination thereof.

5. The non-transitory physical machine readable storage medium of claim 4, wherein the at least one recommended data item is based on:
   a. aggregated feedback from the at least one prior user; or
   b. aggregated feedback from the at least one user; or
   c. any combination thereof.

6. The non-transitory physical machine readable storage medium of claim 1, wherein the at least one ontology-based index is comprised of at least one of the following:
   a. an ontology identifier;
   b. an concept index; or
   c. a case identifier; or
   d. any combination thereof.

7. A computer-implemented search method, the method comprising:
   a. receiving at least one query from at least one user;
   b. accepting at least one user preference from the at least one user using at least one user processor;
   c. refining the at least one query using the at least one user preference using a refining processor;
   d. reformulating the at least one query through semantic mediation information using at least one ontology processor;
   e. retrieving at least one user query case similar to the at least one query from at least one user query case base using at least one case management processor;
   f. maintaining at least one ontology-based index using the at least one case management processor;
   g. storing at least one pre-compiled user query, or at least one artifact, or a combination thereof, in at least one repository;
   h. decomposing the at least one query into at least one subquery using the semantic mediation information utilizing at least one query formulation processor; and
   i. executing the at least one subquery in order to obtain at least one search result; and wherein the at least one case management processor retrieves the at least one user query case similar to the at least one query from the at least one user query case base using at least one algorithm using at least one ontology-based index; and wherein the at least one algorithm limits a number of user query cases retrieved to a predefined maximum.

8. The computer-implemented search method of claim 7, the method further comprising:
   a. dispatching at least one subquery to at least one data source using at least one web services processor;
   b. managing the at least one user preference using a preferences processor;
   c. ranking at least one subquery result according to at least one user preference using a ranking processor; and
   d. transmitting the at least one search result to the at least one user for display on at least one graphical user interface.

9. The computer-implemented search method of claim 8, wherein the at least one data source is selected from at least one of the following:
   a. Yahoo! Images;
   b. TerraServer;
   c. the Semantic Web; or
   d. the World Wide Web;
   e. or any combination thereof.

10. The computer-implemented search method of claim 8, wherein the preferences processor stores user attributes comprising at least one of the following:
    a. a weight associated with the at least one data source based on a predefined weighting scale;
    b. a weight associated with at least one term comprising the query; or
    c. any combination thereof.

11. The computer-implemented search method of claim 7, the method further comprising:
    a. receiving feedback from the at least one user based on the at least one search result displayed;
    b. generating at least one user query case based on the feedback; and
    c. storing the at least one user query case in at least one repository.

12. The computer-implemented search method of claim 11, wherein the feedback received from the user includes a rating of at least one of the following:
    a. highly relevant;
    b. relevant;
    c. highly not relevant; or
    d. unclear; or
    e. any combination thereof.

13. The computer-implemented search method of claim 7, the method further comprising:
    a. accessing at least one domain model database using the ontology processor;
    b. consulting at least one authoritative name service using the ontology processor; and
    c. providing at least one query refinement to the query formulation processor using the at least one authoritative name service.

14. The computer-implemented search method of claim 13, wherein the at least one authoritative name service is selected from at least one of the following:
    a. WordNet;
    b. GNIS; or
    c. GNS; or
    d. any combination thereof.

15. The computer-implemented search method of claim 13, wherein the domain model is specified in web ontology language.

* * * * *